United States Patent [19]

Miller

[11] 4,062,415

[45] Dec. 13, 1977

[54] METHOD FOR WEIGHING A VESSEL SUPPORTED BY SHAFTS JOURNALED IN PRESSURIZED BEARINGS

[75] Inventor: A. Leslie Miller, Pittsburgh, Pa.

[73] Assignee: Koppers Company, Inc., Pittsburgh, Pa.

[21] Appl. No.: 734,027

[22] Filed: Oct. 20, 1976

[51] Int. Cl.² ............................ G01G 5/04; C21C 5/50
[52] U.S. Cl. .................................... 177/208; 177/254; 177/DIG. 9; 266/78; 266/91
[58] Field of Search ......... 177/208, 209, 254, DIG. 9; 266/78, 91

[56] References Cited

U.S. PATENT DOCUMENTS

| 3,091,303 | 5/1963 | Moses et al. ......................... 177/208 |
| 3,256,948 | 6/1966 | Annen et al. ..................... 177/211 X |
| 3,319,728 | 5/1967 | Johansson et al. .............. 177/211 X |
| 3,746,328 | 7/1973 | Martt ...................................... 266/78 |

Primary Examiner—George H. Miller, Jr.
Attorney, Agent, or Firm—R. Lawrence Sahr; Oscar B. Brumback

[57] ABSTRACT

The weight of a vessel having trunnion shafts supported by bearings fitted with pressure pads is determined as a function of the fluid pressure necessary to raise the shafts a constant distance and maintain the distance constant.

9 Claims, 2 Drawing Figures 4,062,415

METHOD FOR WEIGHING A VESSEL SUPPORTED BY SHAFTS JOURNALED IN PRESSURIZED BEARINGS

BACKGROUND OF THE INVENTION

1. Field of the Invention:

The present invention relates to steelmaking and particularly to steelmaking by means of a basic oxygen furnace (BOF), ad more particularly to a method for weighing, by fluid pressure in an hydrostatic fluid bearing, the BOF converter for determining process information.

2. Description of the Prior Art:

The concept of weighing a BOF converter to determine process information during a blowing cycle is not novel. Accurate in-process weight variations, measured by clusters of electronic compression load cells, called sometimes "weighing transducers" located in the bearing pedestals of a small BOF converter in British Steel Corporation plant in Llanwern, Wales, is described in an article in Journal of Metals, July 1974.

U.S. Pat. No. 3,746,328 to J. W. Martt describes a fluid bearing that is used to support a tiltable metallurgical vessel such as a BOF converter. Such fluid bearing includes "bearing pads" which are pressurized by hydraulic fluid. The shafts of the BOF converter are raised on a pressurized film of oil and the fluid bearing structure compensates for sag along the axis of the BOF trunnion shafts due to the weight of the vessel itself and its load. The fluid bearing structure also compensates for effects of sag during repeatedly changing load and tilting conditions.

SUMMARY OF THE INVENTION

The invention comprises a method for measuring the weight of a vessel having shafts journaled in bearings fitted with fluid-actuated pressure pads acting on said shafts, wherein the pad as are pressurized and the shafts are raised a distance that is controllably constant. The weight of the vessel is measured as a function of the pressure of the fluid acting on the pads.

For a further understanding of the invention and for features and advantages, reference may be made to the following description and the drawings which illustrate a preferred embodiment of equipment which is suitable for practicing the method of the invention.

DETAILED DESCRIPTION

Figure 1:
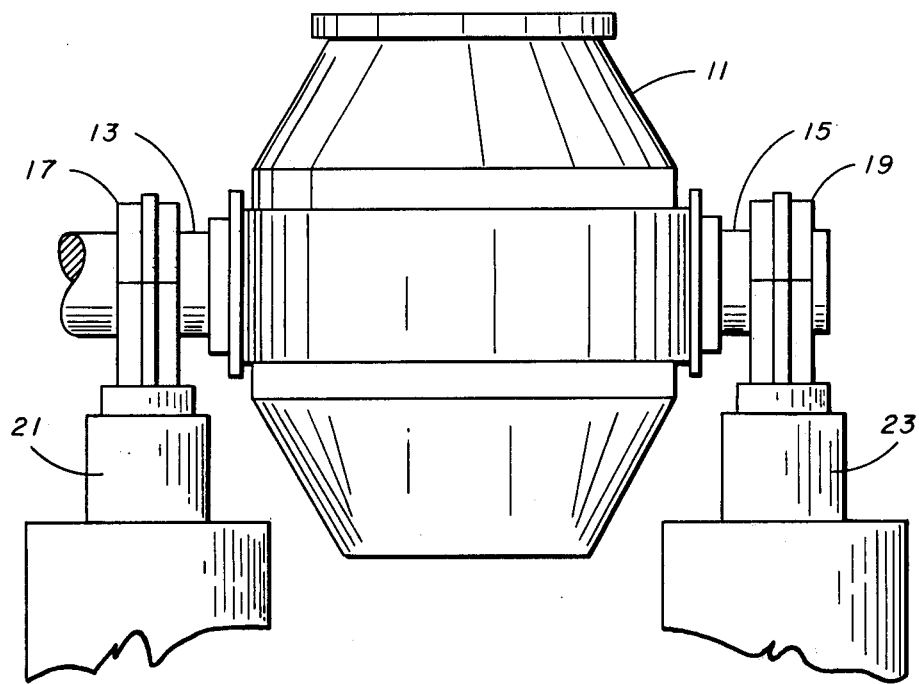
FIG. 1 is a schematic elevational view of a typical BOF converter supported on bearings fitted with an embodiment of such equipment.
Figure 2:
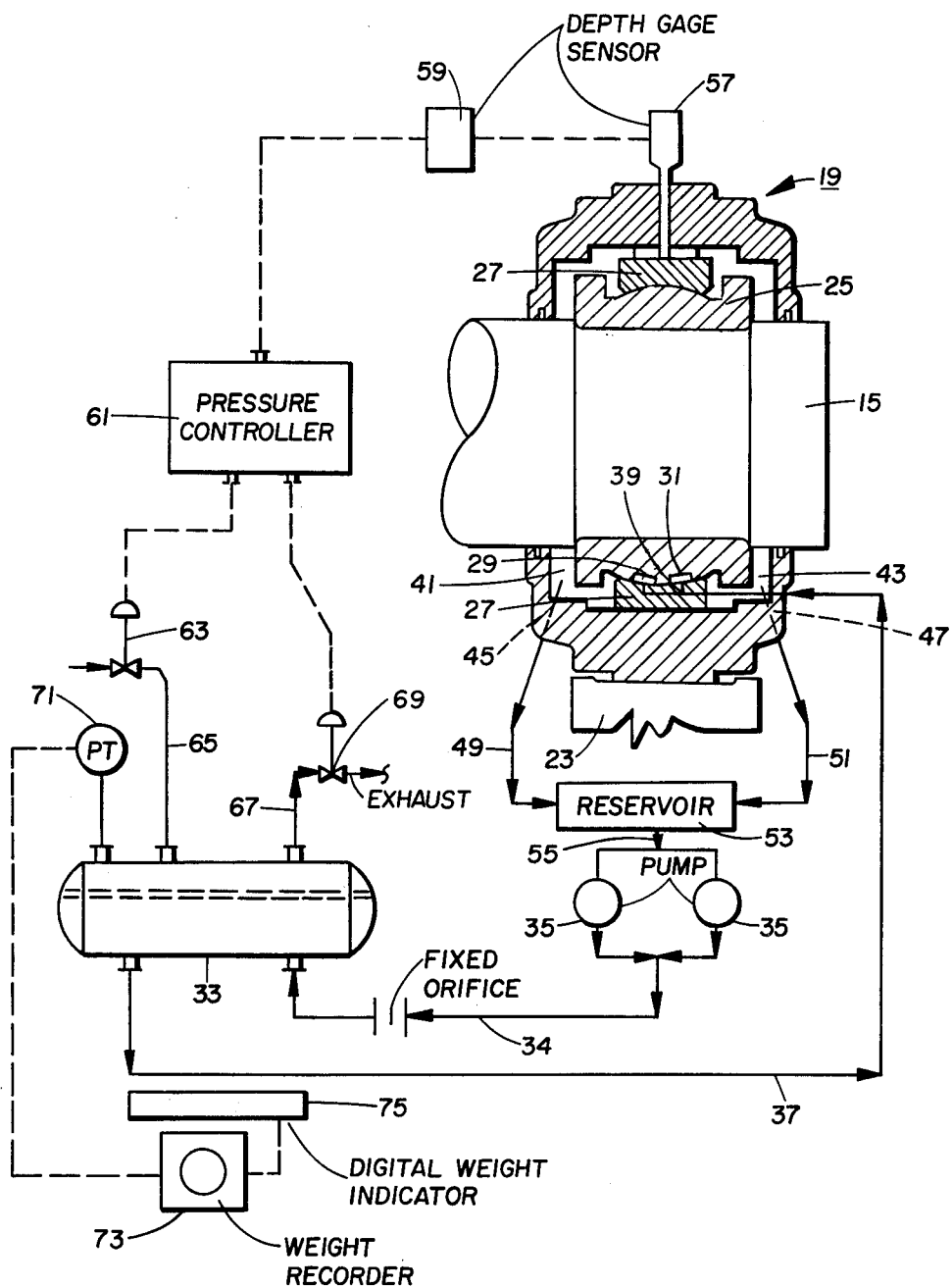
FIG. 2 is a schematic view of a system for accomplishing the purpose of the invention as applied to one bearing of FIG. 1.

Referring to FIG. 1, a typical BOF converter 11 is provided with a pair of trunnions 13, 15 that are journaled in bearings 17, 19 supported on pedestals 21, 23. FIG. 2 illustrates schematically and typically a bearing 19; it is understood, of course, that bearing 17 is similar and the system described hereinafter as applied to bearing 19 is also applicable to bearing 17.

Bearing 19, substantially like bearing 40 that is shown and described in U.S. Pat. No. 3,746,328, includes a sleeve 25 secured to the trunnion shaft 15. A bearing body block 27 surrounds the sleeve 25 and has a plurality of fluid bearing channels 29, 31 in the lower half of the bearing block 27. Fluid under pressure is supplied to these channels 29, 31 from an accumulator 33 which is pressurized by pumps 35, shown as a pair, the pressurizing fluid flowing in conduit 34 into the accumulator 33. The pressurized fluid flows from the accumulator 33 in line 37 and passage 39 in the lower portion of the bearing block 27.

Pressurizing fluid flows from the channels 29, 31 into voids 41, 43 outside the ends of the bearing block 27, and passages 45, 47 in the bearing shell 19, and conduits 49, 51 convey the pressurizing fluid to a reservoir 53. As shown in FIG. 2, the pumps 35 draw pressurizing fluid from the reservoir 53 through conduit 55.

Bearing 19 is provided with a depth gage 57 in the top of the bearing cap. The depth gage 57 contacts the bearing body portion 27 and rises and falls as the bearing sleeve 25 and trunnion shaft 15 rise and fall. The rise of the gage is indicative of the gap between the sleeve 25 and the bearing body portion 27.

The gage 57 may be part of either a mechanical, electronic or an optical depth gage sensor 59. The depth gage sensor 59 is influential of a pressure controller that is, in turn, influential of a pressure controller 61. The pressure controller 61 acts on a flow control valve 63 in a fluid line 65, carrying a gaseous fluid uner pressure that may be as high as 4500 psig. The fluid line 65 is connected to the accumulator 33 and maintains enough pressure on pressurizing fluid 65 therein.

Accumulator 33 is fitted with an exhaust conduit 67 in which a flow control valve 69 is situated, such valve 69 being influenced by the pressure controller 61, as shown. The conduit 67 exhausts the pressurizing gaseous fluid in the accumulator to atmosphere.

Accumulator 33 is also fitted with a pressure transmitter 71 that is connected operatively to a weight recorder 73 and a digital weight indicator 75.

As for the depth gage 57 and sensor 59, they may be a micrometer type depth gage, insertion type strain gage, a built-in pressductor, a pneumatic, hydraulic, mechanical, or optical device capable of measuring accurately to one thousandth (0.001) of an inch. Those skilled in the art will know of such types of units and can select a suitable unit from those available in the market place.

In operation, pressurized fluid, usually a lubricating hydraulic fluid, is supplied to the channels 29, 31 from the accumulator 33 and the pressurized hydraulic fluid raises the sleeve 25 and trunnion shaft 15. The distance the shaft is raised is a specified and controllable distance, being controlled by regulating the pressure of the hydraulic fluid in the system.

The pressure of the gaseous fluid in the accumulator determines the pressure of the hydraulic fluid in the system and acting on the sleeve to raise it.

The pressure of the gaseous fluid in the accumulator is regulated in response to signals from the depth gage sensor acting on the pressure controller.

If a constant gap is maintained in the bearing, the total weight on the bearing then is directly proportional to the fluid pressure required to maintain that gap. The fluid pressure divided by the unchanging supporting surface area, provides a direct reading of the weight on the bearing. The weight is read from the weight recorder and the digital weight indicator.

Thus, a change in weight of the vessel (the weight on both bearings) and/or contents is accompanied by a corresponding change in the fluid supporting pressure.

From the foregoing description of one embodiment of the invention, those skilled in the art should recognize many important features and advantages of it, among wich the following are particularly significant:

That even small changes in weight, such as the carbon loss during a blowing period, of a BOF can be accurately measured by the method of the present invention;

That the method of the present invention automatically maintains the fluid gap between the seat and the trunnion shaft a controlled distance, and with a constant gap distance the total weight on the bearing is measured as in dirent proportion to the fluid pressure required to maintain the constant gap distance; and That the method of the present invention is simple, accurate and effective in measuring even the losses in weight of carbon in the metal during a blowing cycle.

Although the invention has been described herein with a certain degree of particularity it is understood that the present disclosure has been made only as an example and that the scope of the invention is defined by what is hereinafter claimed.

What is claimed is:

1. A method for measuring the weight of a vessel having shafts journaled in bearings fitted with fluid-actuated pressure pads acting on said shafts, wherein the improvement in said method comprises:
   a. pressurizing said pads whereby said shafts raise a distance above said bearings;
   b. measuring the resulting vertical distance of said shafts;
   c. controlling the pressure on said pads so that said vertical lift distance is constant; and
   d. measuring the weight of the vessel as a function of the pressure applied to said source of supply.

2. The invention of claim 1 wherein:
   a. measuring the weight of said vessel includes reading said weight on a digital weight indicator.

3. The invention of claim 1 wherein:
   a. measuring the weight of said vessel includes recording said weight.

4. The invention of claim 1 including the steps of:
   a. flowing fluid from a pressurized source of supply to said pads; and
   b. maintaining a controlled pressure on said fluid in said source of supply.

5. The invention of claim 4 including the steps of:
   a. collecting excess fluid exuding from said pads; and
   b. flowing said excess fluid to said source of supply.

6. The invention of claim 5 including the steps of:
   a. flowing said excess fluid into a reservoir; and
   b. pumping said excess fluid from said reservoir to said source of supply.

7. A method for measuring the weight of a vessel having shafts journaled in bearings fitted with fluid-actuated pressure pads acting on said shafts, wherein the improvement in said method comprises:
   a. flowing fluid from a pressurized source of supply to said pads whereby said shafts raise a distance above said bearings;
   b. measuring said distance;
   c. collecting excess fluid exuding from said pads;
   d. flowing said excess fluid to a reservoir;
   e. pumping said excess fluid into said source of supply;
   f. maintaining a controlled pressure on said source of supply and fluid acting on said pads whereby said distance is constant; and
   g. measuring the weight of said vessel as a function of said pressure applied to said source of supply.

8. The invention of claim 7 wherein:
   a. measuring the weight includes recording said weight.

9. The invention of claim 7 wherein:
   a. measuring the weight includes reading the weight on a digital weight indicator.

* * * * *